(12) United States Patent
Son et al.

(10) Patent No.: US 12,417,052 B2
(45) Date of Patent: Sep. 16, 2025

(54) STORAGE CONTROLLER PERFORMING ACTIVE ZONE REFRESH, METHOD OF OPERATING STORAGE CONTROLLER, AND METHOD OF OPERATING STORAGE DEVICE HAVING STORAGE CONTROLLER

(71) Applicant: Samsung Electronics Co., Ltd., Suwon-si (KR)

(72) Inventors: Minsik Son, Hwaseong-si (KR); Hyunkoo Kim, Suwon-si (KR); Junseok Park, Seoul (KR); Suhwan Kim, Yongin-si (KR)

(73) Assignee: Samsung Electronics Co., Ltd., Gyconggi-do (KR)

( * ) Notice: Subject to any disclaimer, the term of this patent is extended or adjusted under 35 U.S.C. 154(b) by 209 days.

(21) Appl. No.: 17/970,628

(22) Filed: Oct. 21, 2022

(65) Prior Publication Data

US 2023/0236765 A1    Jul. 27, 2023

(30) Foreign Application Priority Data

Jan. 26, 2022    (KR) .................. 10-2022-0011577
May 17, 2022    (KR) .................. 10-2022-0060256

(51) Int. Cl.
*G06F 3/06*    (2006.01)

(52) U.S. Cl.
CPC .......... *G06F 3/0659* (2013.01); *G06F 3/0625* (2013.01); *G06F 3/0679* (2013.01)

(58) Field of Classification Search
CPC ..... G06F 3/0659; G06F 3/0625; G06F 3/0679
See application file for complete search history.

(56) References Cited

U.S. PATENT DOCUMENTS

2017/0177235 A1*    6/2017    Nishikubo .......... G11C 11/5628
2020/0089407 A1    3/2020    Baca et al.
(Continued)

FOREIGN PATENT DOCUMENTS

| KR | 10-2021-0001898 A | 1/2021 |
| KR | 10-2021-0076143 A | 6/2021 |
| KR | 10-2021-0079394 A | 6/2021 |

OTHER PUBLICATIONS

Han, Kyuhwa, et al. "ZNS+: Advanced zoned namespace interface for supporting in-storage zone compaction." 15th {USENIX} Symposium on Operating Systems Design and Implementation ({OSDI} 21). 2021. (Year: 2021).*

(Continued)

*Primary Examiner* — Nicholas J Simonetti
(74) *Attorney, Agent, or Firm* — Harness, Dickey & Pierce, P.L.C.

(57) ABSTRACT

Disclosed is a method of operating a storage controller which communicates with a host and a non-volatile memory device. The method includes receiving a first state transition request for a device open from the host, performing a first active zone refresh operation of the non-volatile memory device in response to the first state transition request such that a zone, which has an active state before an immediately previous power-off is processed to a sequentially writable state in one block, receiving, by a first buffer memory, first target data to be stored in a first block of a first zone among the plurality of zones from the host depending on a first write request, receiving a first power-off request from the host, during processing the first write request, and storing the first target data in a first power loss protection (PLP) block of the non-volatile memory device.

20 Claims, 12 Drawing Sheets

(56) References Cited

U.S. PATENT DOCUMENTS

| | | |
|---|---|---|
| 2020/0409589 A1 | 12/2020 | Bennett et al. |
| 2021/0026800 A1* | 1/2021 | Hahn .................... G06F 3/0619 |
| 2021/0081330 A1 | 3/2021 | Bennett et al. |
| 2021/0089217 A1 | 3/2021 | Bjorling et al. |
| 2021/0132827 A1 | 5/2021 | Helmick et al. |
| 2021/0263674 A1 | 8/2021 | Shin et al. |
| 2021/0318801 A1 | 10/2021 | Benisty et al. |
| 2021/0318820 A1 | 10/2021 | Jin et al. |
| 2022/0129171 A1* | 4/2022 | Karr ...................... G06F 3/0683 |
| 2022/0156000 A1* | 5/2022 | Inbar .................... G06F 3/0658 |
| 2022/0229596 A1* | 7/2022 | Jung ..................... G06F 3/0656 |
| 2022/0261170 A1* | 8/2022 | Vohra ................... G06F 3/0688 |
| 2022/0357859 A1* | 11/2022 | Labat .................... G06F 3/0644 |
| 2023/0115457 A1* | 4/2023 | Koo ..................... G11C 29/702 |
| | | 711/154 |

OTHER PUBLICATIONS

Maneas, Stathis, et al. "A study of {SSD} reliability in large scale enterprise storage deployments." 18th USENIX Conference on File and Storage Technologies (FAST 20). 2020. (Year: 2020).*

Lee, Youngjae, Jeeyoon Jung, and Dongkun Shin. "Buffered i/o support for zoned namespace SSD." 2021 IEEE International Conference on Consumer Electronics-Asia (ICCE-Asia). IEEE, 2021. (Year: 2021).*

* cited by examiner

STORAGE CONTROLLER PERFORMING ACTIVE ZONE REFRESH, METHOD OF OPERATING STORAGE CONTROLLER, AND METHOD OF OPERATING STORAGE DEVICE HAVING STORAGE CONTROLLER

CROSS-REFERENCE TO RELATED APPLICATIONS

This application claims priority under 35 U.S.C. § 119 to Korean Patent Application Nos. 10-2022-0011577 filed on Jan. 26, 2022, and 10-2022-0060256 filed on May 17, 2022, in the Korean Intellectual Property Office, the disclosures of each of which are incorporated by reference herein in their entireties.

BACKGROUND

Embodiments of the present disclosure described herein relate to a storage controller, and more particularly, relate to a storage controller performing an active zone refresh operation, a method of operating the storage controller, and a method of operating a storage device including the storage controller.

A memory device stores data in response to a write request and outputs data stored therein in response to a read request. For example, the memory device may be classified as a volatile memory device, which loses data stored therein when a power supply is interrupted (such as a dynamic random access memory (DRAM) device or a static RAM (SRAM) device), or a non-volatile memory device, which retains data stored therein even when a power supply is interrupted (such as a flash memory device, a phase-change RAM (PRAM), a magnetic RAM (MRAM), or a resistive RAM (RRAM)).

In general, the non-volatile memory device may store data depending on a random access. The random access accompanies a frequent garbage collection operation for the entire region, thereby causing a decrease in the lifetime of a storage device. As a large over provisioning (OP) region is allocated for frequent garbage collection, wear leveling, and bad block management, an available storage capacity of the storage device may be decreased. To prevent the above issue, there may be a technique for dividing memory blocks of the non-volatile memory device into zones and sequentially storing related data within a zone.

SUMMARY

Embodiments of the present disclosure provide a storage controller performing an active zone refresh operation, a method of operating the storage controller, and a method of operating a storage device including the storage controller.

According to an embodiment, a storage controller is configured to communicate with a host and a non-volatile memory device. A method of operating the storage device includes receiving, from the host, a first state transition request for a device open; performing a first active zone refresh operation of the non-volatile memory device in response to the first state transition request such that a zone, from among a plurality of zones of the non-volatile memory device and which has an active state before an immediately previous power-off, is processed to a sequentially writable state in at least one block; receiving, by a first buffer memory, first target data to be stored in a first block of a first zone, among the plurality of zones, based on a first write request received from the host after performing the first active zone refresh operation, receiving a first power-off request from the host before the first write request is completed; and storing the first target data in a first power loss protection (PLP) block of the non-volatile memory device, instead of the first block, based on the first power-off request.

According to an embodiment, a storage device is configured to communicate with a host. A method of operating the storage device includes receiving, from a host, a state transition request for a device open; performing an active zone refresh operation of a non-volatile memory device in response to the state transition request such that a zone, from among a plurality of zones of the non-volatile memory device and which has an active state before an immediately previous power-off, is processed to a sequentially writable state in at least one block; receiving, by a buffer memory, target data to be stored in a target block of a target zone, among the plurality of zones, based on a first write request received from the host after performing the active zone refresh operation; receiving a power-off request from the host before the write request is completed; and storing the target data in a power loss protection (PLP) block of the non-volatile memory device, instead of the target block, based on the power-off request.

According to an embodiment, a storage controller includes a buffer memory configured to receive, from a host, first target data to be stored in a target block of a target zone, among a plurality of zones of a non-volatile memory device, based on a write request; and processing circuitry configured to receive, from the host, a state transition request for a device open, perform an active zone refresh operation of the non-volatile memory device in response to the state transition request, allow the buffer memory to receive the first target data from the host, and allow the buffer memory to store the first target data in a power loss protection (PLP) block of the non-volatile memory device, instead of the target block, when a power-off request is received from the host before the write request is completed, and wherein the active zone refresh operation includes processing a zone, from among the plurality of zones and which is an active state before an immediately previous power-off, such that at least one of block of the processed zone is configured to perform a sequential write operation.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
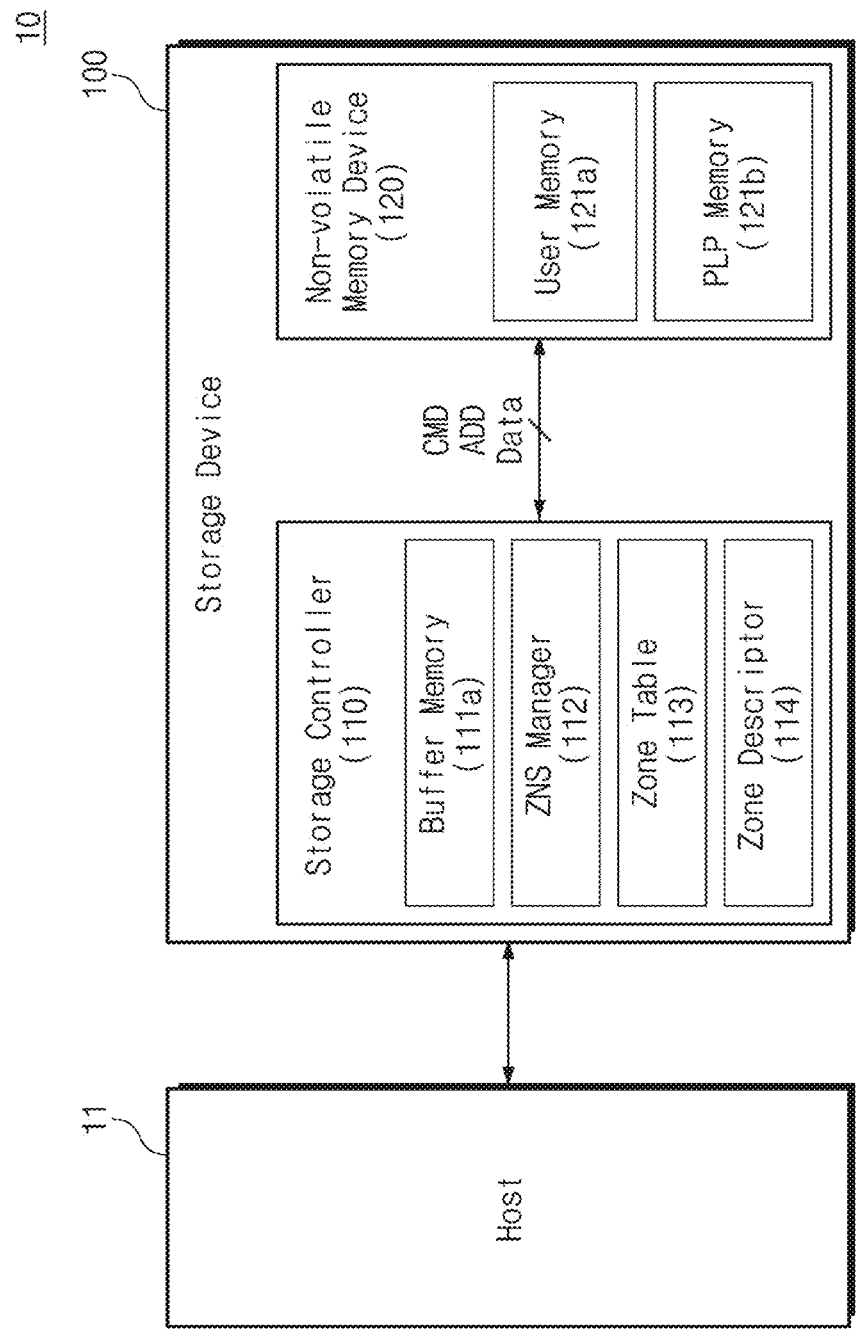
FIG. 1 is a block diagram of a storage system according to some embodiments of the present disclosure.

Below, embodiments of the present disclosure will be described in detail and clearly to such an extent that one skilled in the art easily carries out the present disclosure. Functional elements in the following description and the corresponding blocks shown in the drawings, unless indicated otherwise, may be implemented in processing circuitry such as hardware, software, or a combination thereof configured to perform a specific function. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. and/or the processing circuitry may include electrical components such as at least one of transistors, resistors, capacitors, etc. and/or may include electrical components such as logic gates including at least one of AND gates, OR gates, NOR gates, NAND gates, NOT gates, XOR gates, etc.

FIG. 1 is a block diagram of a storage system according to some embodiments of the present disclosure. Referring to FIG. 1, a storage system 10 may include a host 11 and a storage device 100. In some embodiments, the storage system 10 may be a computing system, such as a personal computer (PC), a notebook, a laptop, a server, a workstation, a tablet PC, a smartphone, a digital camera, a black box, and/or the like, which is configured to process a variety of information.

The host 11 may control an overall operation of the storage system 10. For example, the host 11 may store data in the storage device 100 and/or may read data stored in the storage device 100. For example, the host 11 may provide write data to the storage device 100, and/or the host 11 may request read data stored in the storage device 100.

The storage device 100 may include a storage controller 110 and a non-volatile memory device 120. The non-volatile memory device 120 may store data. The storage controller 110 may store data in the non-volatile memory device 120 and/or may read data stored in the non-volatile memory device 120. The non-volatile memory device 120 may operate under the control of the storage controller 110. For example, based on a command CMD indicating an operation and an address ADD indicating a location of data, the storage controller 110 may store the data in the non-volatile memory device 120 and/or may read the data stored in the non-volatile memory device 120.

In some embodiments, the storage device 100 may allocate corresponding memory blocks to a zone depending on a request of the host 11 and may sequentially store data in the allocated memory blocks. The zone may be conceptually referred to as some memory blocks physically continuous to each other from among a plurality of memory blocks. For example, the storage controller 110 and the non-volatile memory device 120 may support the zoned namespace (ZNS) standard of the non-volatile memory (NVM) express (NVMe). The ZNS standard will be described in detail with reference to FIGS. 4 and 5.

In some embodiments, the non-volatile memory device 120 may be a NAND flash memory device, but the present disclosure is not limited thereto. For example, the non-volatile memory device 120 may be one of various storage devices, which retain data stored therein even though a power is turned off, such as a phase-change random access memory (PRAM), a magnetic random access memory (MRAM), a resistive random access memory (RRAM), a ferroelectric random access memory (FRAM), and/or the like.

The storage controller 110 may include a buffer memory 111a, a ZNS manager 112, a zone table 113, and a zone descriptor 114.

The buffer memory 111a may temporarily store data received from the host 11 and/or may temporarily store data received from the non-volatile memory device 120. The buffer memory 111a may assist an operation of copying data stored in a memory block of the non-volatile memory device 120 to any other memory block thereof.

The ZNS manager 112 may receive requests complying with the ZNS standard from the host 11 and may process the requests complying with the ZNS standard. For example, depending on the request of the host 11, the ZNS manager 112 may allocate a memory block to a zone or may release the allocated memory block, and may control the buffer memory 111a such that data present in the buffer memory 111a are provided to the allocated memory block.

The zone table 113 may manage zone block information indicating memory blocks allocated to the zone. For example, the ZNS manager 112 may manage a plurality of zones. Under control of the ZNS manager 112, the zone table 113 may manage a plurality of zone block information indicating memory blocks allocated to each of a plurality of zones. In the event that a new memory block is allocated to the zone or when a previously allocated memory block is released from the zone, the ZNS manager 112 may update the zone table 113 based on the event.

When the storage device 100 is powered off, the plurality of zone block information present in the zone table 113 may be stored in the non-volatile memory device 120 under control of the ZNS manager 112.

The zone descriptor 114 may manage a write pointer indicating a logical block address of target data that are received from the host 11 and are stored in the buffer memory 111a. By using the write pointer of the zone descriptor 114, the ZNS manager 112 may control the buffer memory 111a such that the target data of the buffer memory 111a are stored to be sequential (or continuous) to user data previously stored in the non-volatile memory device 120.

When the storage device 100 is powered off, the zone descriptor 114 may store the write pointer in the non-volatile memory device 120 under control of the Zone descriptor 114.

The non-volatile memory device 120 may include a user memory 121a and a power loss protection (PLP) memory 121b.

The user memory 121a may store the user data provided through the buffer memory 111a from the host 11 depending on the write request. The user memory 121a may include a plurality of user memory blocks.

When a power-off request is generated while the write request is processed, the PLP memory 121b may store data present in the buffer memory 111a instead of the user memory 121a. The PLP memory 121b may include a plurality of PLP memory blocks. The power-off request may be used to request pre-processing for the purpose of preventing the loss of data before the power supply to the storage device 100 is interrupted (or blocked). For example, the power-off request may indicate a normal power-off (NPO) and/or a sudden power-off (SPO).

In some embodiments, the user memory block of the user memory 121a may be implemented in a first type, and the PLP memory block of the PLP memory 121b may be implemented in a second type. The first type may refer to a type appropriate for managing a large amount of data. The second type may refer to a type appropriate for high reliability and fast write.

For example, the first-type memory block may be implemented with one of cells, which store a plurality of bits, such as a multi-level cell (MLC) storing 2 bits, a triple level cell storing 3 bits, and a quadruple level cell (QLC) storing 4 bits. The second-type memory block may be implemented with a single level cell (SLC) storing one bit.

In some embodiments, the ZNS manager 112 may perform an active zone refresh operation. The active zone refresh operation may refer to an operation of processing a zone, which is an active state before an immediately previous power-off, from among the plurality of zones so as to be physically sequentially written in one memory block. For example, the ZNS manager 112 may sequentially copy data of a memory block allocated in an immediately previous power-off and data backed up to the PLP memory block to a newly allocated memory block. Afterwards, the ZNS manager 112 may discard the memory block and the PLP memory block that include invalid data. The active zone refresh operation will be described in detail with reference to FIGS. 6, 7, and 9.

As described above, according to some embodiments of the present disclosure, the storage controller 110 may perform the active zone refresh operation. Through the active zone refresh operation, the storage controller 110 may maintain a state of being written in a physically sequential manner, by guaranteeing the serializability in the same block even though the power-off occurs. Also, the storage controller 110 may discard a memory block having invalid data, thus reducing the block waste and increasing an available storage capacity of the non-volatile memory device 120.

Figure 2:
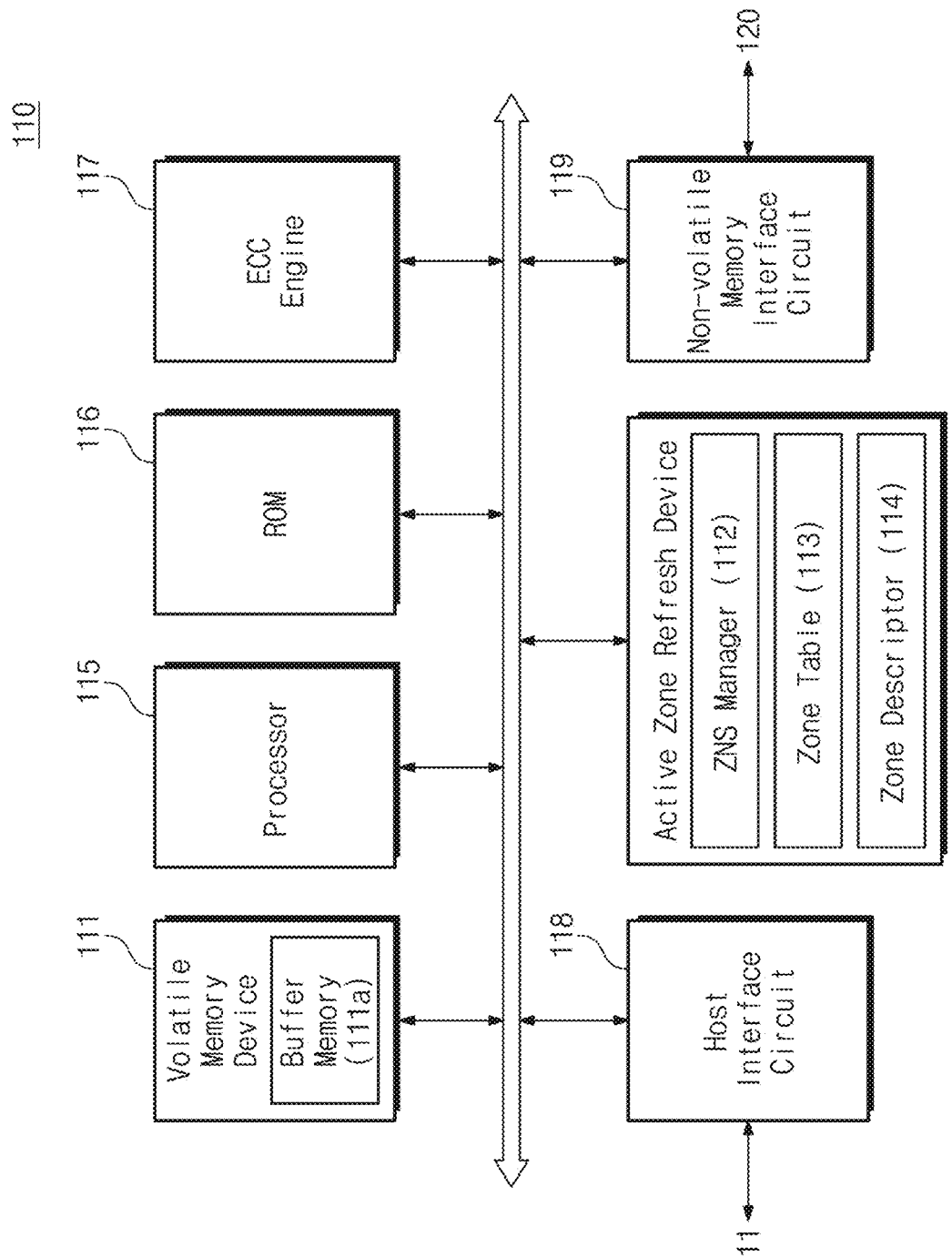
FIG. 2 is a block diagram illustrating a storage controller of FIG. 1 in detail, according to some embodiments of the present disclosure.

FIG. 2 is a block diagram illustrating a storage controller of FIG. 1 in detail, according to some embodiments of the present disclosure. Referring to FIGS. 1 and 2, the storage controller 110 may communicate with the host 11 and the non-volatile memory device 120.

The storage controller 110 may include a volatile memory device 111, the ZNS manager 112, the zone table 113, the zone descriptor 114, a processor 115, a read only memory (ROM) 116, an error correcting code (ECC) engine 117, a host interface circuit 118, and a non-volatile memory interface circuit 119.

The ZNS manager 112, the zone table 113, and the zone descriptor 114 may be collectively referred to as an "active zone refresh device". The active zone refresh device may perform the active zone refresh operation on a plurality of zones. The ZNS manager 112, the zone table 113, and the zone descriptor 114 may respectively correspond to the ZNS manager 112, the zone table 113, and the zone descriptor 114 of FIG. 1.

In some embodiments, the active zone refresh device may be implemented by firmware. For example, the non-volatile memory device 120 may store instructions corresponding to the active zone refresh device. The processor 115 may load the instructions of the non-volatile memory device 120 onto the volatile memory device 111. The processor 115 may execute the loaded instructions such that the active zone refresh device operates. In some embodiments, the processor 115 may include (and/or be included in), for example a plurality of processors and/or processing units.

The volatile memory device 111 may include the buffer memory 111a. The buffer memory 111a may correspond to the buffer memory 111a of FIG. 1. The volatile memory device 111 may be used as a main memory, a cache memory, and/or a working memory of the storage controller 110, as well as the buffer memory 111a. For example, the volatile memory device 111 may be implemented with a static random access memory (SRAM), a dynamic random access memory (DRAM), and/or the like.

The processor 115 may control an overall operation of the storage controller 110. The ROM 116 may be used as a read only memory storing information necessary for the operation of the storage controller 110. The error correction code (ECC) engine 117 may detect and correct an error of data read from the non-volatile memory device 120. For example, the ECC engine 117 may have an error correction capability of a given level. The ECC engine 117 may process data having an error level (e.g., the number of flipped bits) exceeding the error correction capability as an uncorrectable data.

The storage controller 110 may communicate with the host 11 through the host interface circuit 118. In some embodiments, the host interface circuit 118 may be implemented based on at least one of various interfaces such as a SATA (Serial ATA) interface, a PCIe (Peripheral Component Interconnect Express) interface, a SAS (Serial Attached SCSI), an NVMe (Nonvolatile Memory express) interface, an UFS (Universal Flash Storage) interface, and/or the like. Also, the host interface circuit 118 may support the ZNS standard of the NVMe.

The storage controller 110 may communicate with the non-volatile memory device 120 through the non-volatile memory interface circuit 119. In some embodiments, the non-volatile memory interface circuit 119 may be implemented based on a NAND interface. Also, the non-volatile memory interface circuit 119 may support a sequential write operation that complies with the ZNS standard of the NVMe.

Figure 3:
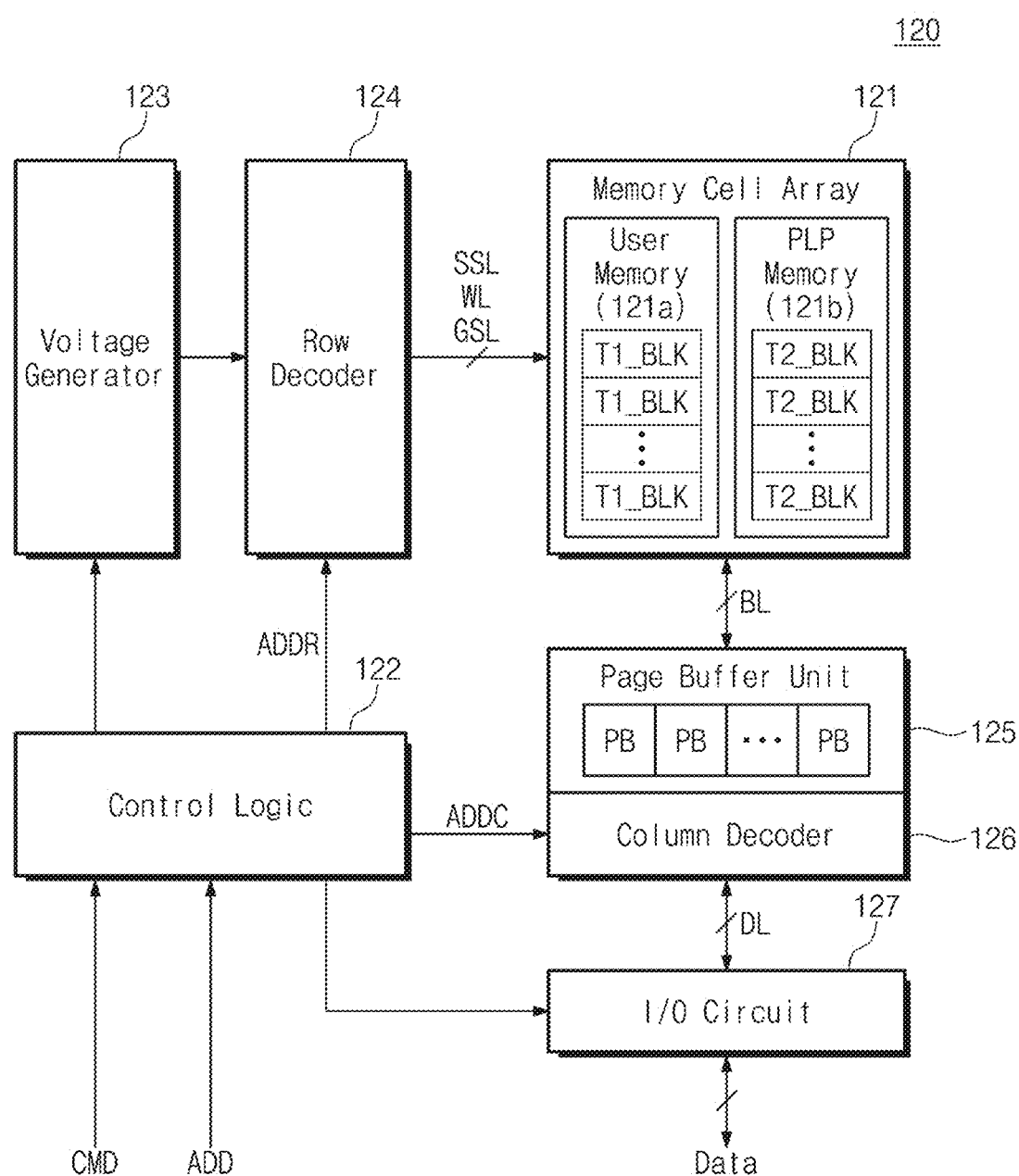
FIG. 3 is a block diagram illustrating a non-volatile memory device of FIG. 1 in detail, according to some embodiments of the present disclosure.

FIG. 3 is a block diagram illustrating a non-volatile memory device of FIG. 1 in detail, according to some embodiments of the present disclosure. Referring to FIGS. 1 and 3, the non-volatile memory device 120 may communicate with the storage controller 110. For example, the non-volatile memory device 120 may receive the address ADD and the command CMD from the storage controller 110. The non-volatile memory device 120 may exchange data with the storage controller 110.

The non-volatile memory device 120 may include a memory cell array 121, control logic 122, a voltage generator 123, a row decoder 124, a page buffer unit 125, a column decoder 126, and an input/output (I/O) circuit 127.

The memory cell array 121 may include the user memory 121a and the PLP memory 121b. The user memory 121a and the PLP memory 121b may respectively correspond to the user memory 121a and the PLP memory 121b of FIG. 1. The memory cell array 121 may include the blocks T1_BLK of the user memory 121a and the PLP blocks T2_BLK of the PLP memory 121b. In some embodiments, the blocks T1_BLK of the user memory 121a and the PLP blocks T2_BLK of the PLP memory 121b may be implemented with VNAND (Vertical NAND)-based memory blocks. For example, the user memory 121a may include a plurality of blocks T1_BLK and the PLP memory 121b may include a plurality of PLP blocks T2_BLK. The blocks T1_BLK may be first-type memory blocks. The first type may refer to a type appropriate for managing a large amount of data. The PLP blocks T2_BLK may be second-type memory blocks. The second type may refer to a type appropriate for high reliability and fast write. Each of the blocks T1_BLK and the PLP blocks T2_BLK may include memory cells of the corresponding type.

The control logic 122 may receive the command CMD and the address ADD from the storage controller 110. The command CMD may refer to a signal indicating an operation to be performed by the non-volatile memory device 120, such as a read operation, a write operation, or an erase operation. The address ADD may include a row address ADDR and a column address ADDC. The control logic 122 may control an overall operation of the non-volatile memory device 120 based on the command CMD and the address ADD. The control logic 122 may generate the row address ADDR and the column address ADDC based on the address ADD.

Under control of the control logic 122, the voltage generator 123 may control voltages to be applied to the memory cell array 121 through the row decoder 124.

The row decoder 124 may receive the row address ADDR from the control logic 122. The row decoder 124 may be connected with the memory cell array 121 through string selection lines SSL, word lines WL, and ground selection lines GSL. The row decoder 124 may decode the row address ADDR and may control voltages to be applied to the string selection lines SSL, the word lines WL, and the ground selection lines GSL based on a decoding result and a voltage(s) received from the voltage generator 123. Depending on voltages applied from the row decoder 124, the memory cell array 121 may store data or may output the stored data.

The page buffer unit 125 may include a plurality of page buffers PB. The page buffer unit 125 may be connected with the memory cell array 121 through the bit lines BL. The page buffer unit 125 may read data from the memory cell array 121 in units of page, by sensing voltages of the bit lines BL.

The column decoder 126 may receive the column address ADDC from the control logic 122. The column decoder 126 may decode the column address ADDC and may provide the data read by the page buffer unit 125 to the I/O circuit 127 based on a decoding result.

Additionally, the column decoder 126 may receive data from the I/O circuit 127 through data lines DL. The column decoder 126 may receive the column address ADDC from the control logic 122. The column decoder 126 may decode the column address ADDC and may provide the data received from the I/O circuit 127 to the page buffer unit 125 based on a decoding result. The page buffer unit 125 may store the data provided from the I/O circuit 127 in the memory cell array 121 through the bit lines BL in units of page.

The I/O circuit 127 may be connected with the column decoder 126 through the data lines DL. The I/O circuit 127 may provide data received from the storage controller 110 to the column decoder 126 through the data lines DL. The I/O circuit 127 may output data received through the data lines DL to the storage controller 110.

Figure 4:
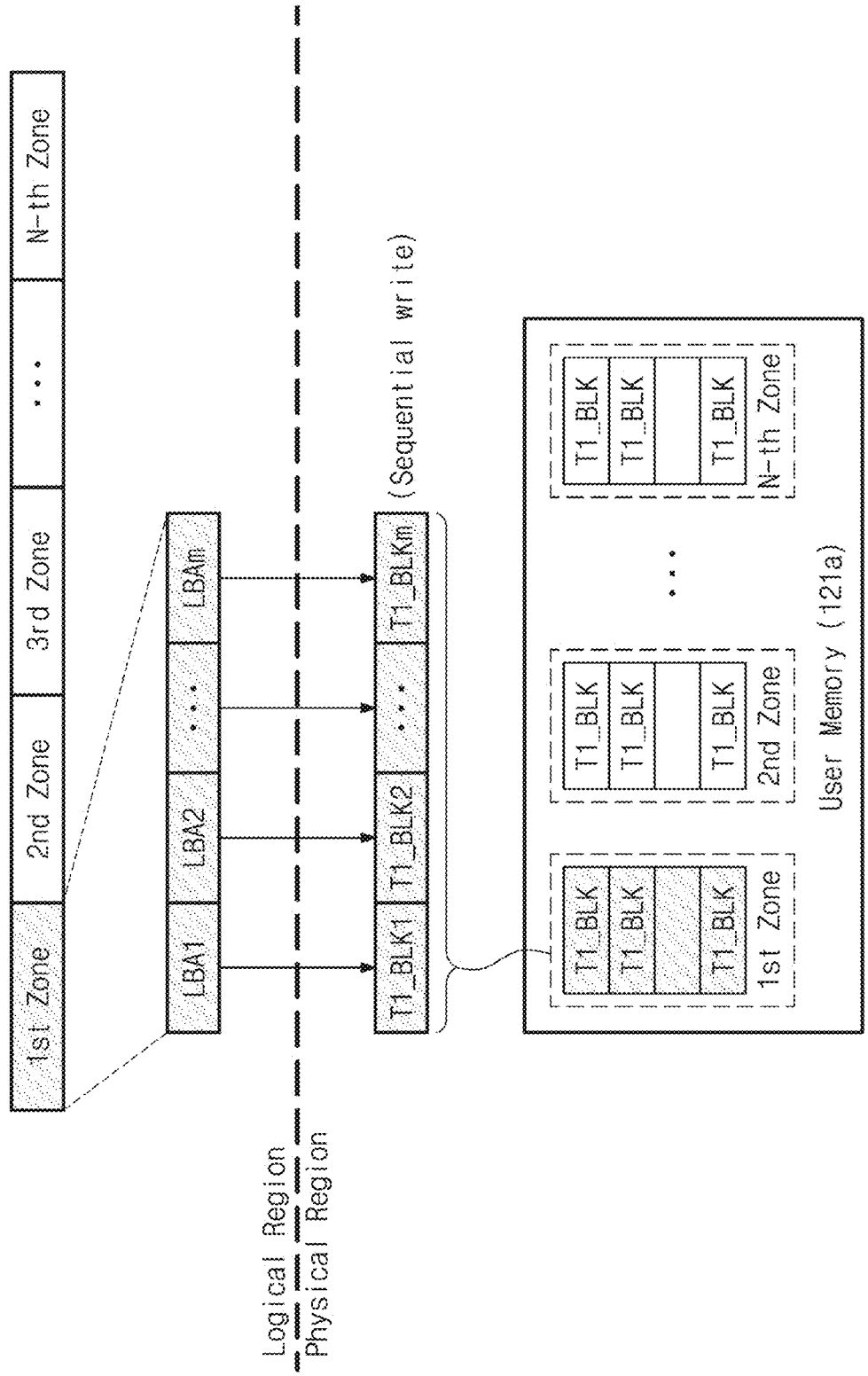
FIG. 4 is a diagram describing a sequential write operation according to some embodiments of the present disclosure.

FIG. 4 is a diagram describing a sequential write operation according to some embodiments of the present disclosure. An operation in which a storage controller sequentially writes data in the user memory 121a will be described with reference to FIGS. 1 and 4.

A conventional storage controller may store data depending on a random access. For example, in the case where data are stored depending on the random access, memory blocks corresponding to logically sequential address blocks may be randomly distributed in a non-volatile memory device. The non-volatile memory device may be incapable of being overwritten in structure. In the case of performing the erase operation, the garbage collection operation in which data are read and are then copied to another memory block may be performed to individually manage valid data and invalid data in a memory block.

A conventional storage controller may frequently perform the garbage collection operation on the entire region of the non-volatile memory device, thereby reducing the lifetime of the non-volatile memory device (e.g., increasing the number of program/erase (P/E) cycles). Also, as a large over provisioning (OP) region is allocated for frequent garbage collection, wear leveling, and bad block management, an available storage capacity of the non-volatile memory device may be decreased.

According to some embodiments of the present disclosure, the storage controller 110 may perform the sequential write operation. For better understanding of the present disclosure, a logical region of first to N-th zones and a physical region of first to N-th zones are illustrated together. Here, "N" represents an integer and may be, e.g., an otherwise arbitrary natural number. The logical region may include addresses capable of being identified by the host 11. The physical region may include locations (or addresses) of memory blocks in the non-volatile memory device 120. The logical region and the physical region may have a mapping relationship.

Referring to the logical region, the storage controller 110 may manage the first to N-th zones. The first to N-th zones may be managed independently of each other. For example, the host 11 may execute a first application and a second application. The first application may manage data included in the first zone. The second application may manage data included in the second zone. For example, data having similar purposes and use periods from among the data managed by the same application may be managed within the same zone.

Each of the first to N-th zones may include a plurality of logical block addresses. For example, the first zone may include first to m-th logical block addresses LBA1 to LBAm. Herein, "m" represents an integer and may be, e.g., an otherwise arbitrary natural number. The first to m-th logical block addresses LBA1 to LBAm may be logically sequential.

The storage controller 110 may store data sequentially in the user memory 121a by using the write pointer. For example, in the case where data corresponding to the first logical block address LBA1 and the second logical block address LBA2 are sequentially programmed in the user memory 121a and the buffer memory 111a of the storage controller 110 stores data corresponding to the third logical block address LBA3, the write pointer may indicate the third logical block address LBA3.

Referring to the physical region, the user memory 121*a* may include the plurality of blocks T1_BLK. The plurality of blocks T1_BLK may be classified into the first to N-th zones. The plurality of blocks T1_BLK of the first zone may be first to m-th blocks T1_BLK1 to T1_BLKm that are physically sequential. The first to m-th blocks T1_BLK1 to T1_BLKm of the first zone may respectively correspond to the first to m-th logical block addresses LBA1 to LBAm of the first zone. The storage controller 110 may manage data received from the host 11 depending on the write request, so as to be stored in the user memory 121*a* logically and physically sequentially. For example, the storage controller 110 may support a sequential write operation.

For better understanding of the present disclosure, the description is given as a logical block address corresponds to one block, but the present disclosure is not limited thereto. Logical block addresses may respectively correspond to sequential sub-blocks in one block or sequential programming units (e.g., a unit by which memory cells are programmed), while maintaining the logical serializability. The correspondence relationship of the logical block address and the memory block may be variously changed and carried out by one skilled in the art.

As described above, according to some embodiments of the present disclosure, the storage controller 110 may manage data in units of zone, instead of managing data with respect to the entire region of the user memory 121*a*. As data management is made in units of zone, the I/O load and additional read and write operations due to garbage collection (GC) may decrease. Accordingly, a data processing speed of the storage device 100 may be improved, and the power consumption of the storage device 100 may decrease. Also, as the load due to the garbage collection decreases, the over provisioning (OP) region may be reduced. This may mean that an available storage capacity of the non-volatile memory device 120 increases.

Figure 5:
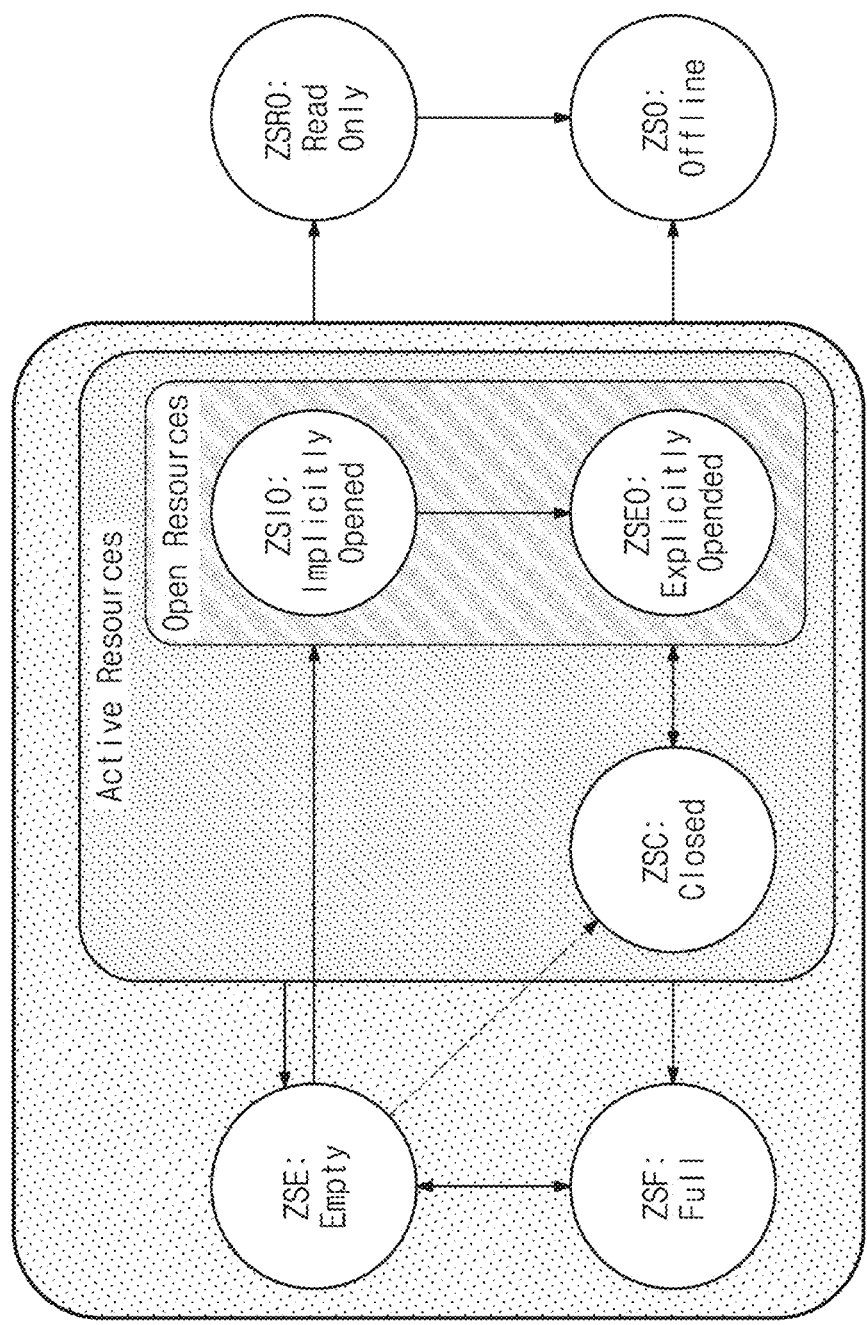
FIG. 5 is a diagram describing states of a storage device according to some embodiments of the present disclosure.

FIG. 5 is a diagram describing states of a storage device according to some embodiments of the present disclosure. A state machine associated with zones of the storage device 100 according to the ZNS standard will be described with reference to FIGS. 1 and 5.

According to some embodiments of the present disclosure, zones managed by the storage device 100 may have one of a zone state (ZS) (e.g., a ZSE state, a ZSIO state, a ZSEO state, a ZSC state, a ZSF state, a ZSRO state, and a ZSO state). As the storage device 100 processes a request received from the host 11, a state of a zone may transition.

The ZSE state, the ZSF state, the ZSRO state, and the ZSO state may be classified as a non-active state. The ZSIO state, the ZSEO state, and the ZSC state may be classified as an active state. Zones of the active state may be limited by a maximum active resources field. The ZSIO state and the ZSEO state may be classified as an open state. Zones of the open state may be limited by a maximum open resources field.

The ZSE state may indicate an empty state. In the ZSE state, data may not be yet stored in memory blocks, and the write pointer may indicate the lowest logical block address (e.g., a logical block address having the smallest number from among logical block addresses managed by a zone). The write pointer of the ZSE state may be valid. The ZSE state may transition to one of the ZSIO state, the ZSEO state, the ZSC state, and the ZSF state.

The ZSIO state may indicate an implicitly opened state. The ZSIO state may be a state implicitly opened by executing a write command received from the host 11. In the ZSIO state, a memory block may store data corresponding to the write command. The ZSIO state may transition to one of the ZSE state, the ZSEO state, the ZSC state, and the ZSF state. When an open resource is saturated, the ZSIO state may transition to the ZSC state even though there is no close command.

The ZSEO state may indicate an explicitly opened state. The ZSEO state may be a state explicitly opened by executing an open command received from the host 11. In the ZSEO state, a memory block may store data corresponding to a write command received subsequently. The ZSEO state may transition to one of the ZSE state, the ZSC state, and the ZSF state. The ZSEO state may have a higher priority to an open resource than the ZSIO state. The ZSEO state may transition to the ZSC state only by the close command.

The ZSC state may indicate a closed state. The transition to the ZSC state may be made 1) when, in the ZSE state, usable active resources are present and a set zone descriptor extension command is received, 2) when, in the ZSIO state, the close command is received or an open resource is saturated, and/or 3) when, in the ZSEO state, the close command is received. In the ZSC state, a memory block is incapable of storing data corresponding to the write command. The ZSC state may transition to one of the ZSE state, the ZSIO state, the ZSEO state, and the ZSF state.

The ZSF state may indicate a full state. In the ZSE state, memory blocks may be filled with data stored therein, and the write pointer may indicate the highest logical block address (e.g., a logical block address having the greatest number from among logical block addresses managed by a zone). The write pointer of the ZSF state may be invalid. The ZSF state may transition to the ZSE state by a reset zone command.

The ZSRO state may indicate a read only state. A zone having the ZSRO state may be a space where a host continues to use a zoned namespace after at least a portion of performance of a zone stops an operation. The ZSRO state may transition to the ZSO state by an offline zone command.

The ZSO state may indicate an offline state. The ZSO state may not have a valid write pointer, may not have active resources, and/or may not have open resources. The ZSO state may not have any other state capable of transitioning.

In some embodiments, the storage device 100 may process a state transition request for a device open. The device open may include a state in which the storage device 100 is capable of receiving data from the host 11. For example, the state transition request for the device open may indicate the transition to the ZSIO state or the ZSIO state.

In some embodiments, the storage device 100 may manage the active state. The active state may include the ZSIO state, the ZSEO state, and the ZSC state.

Figure 6:
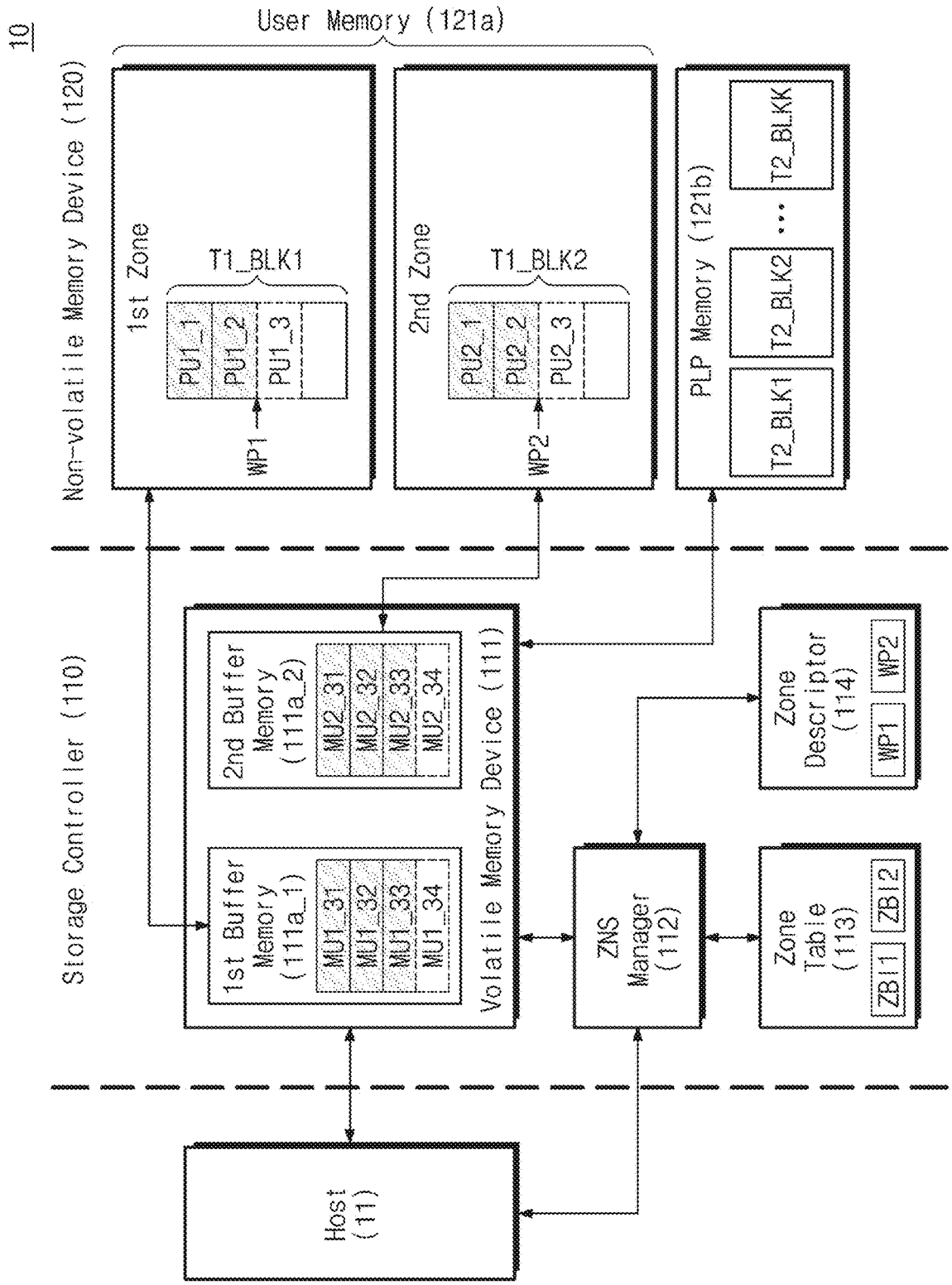
FIG. 6 is a diagram describing a storage system according to some embodiments of the present disclosure.

FIG. 6 is a diagram describing a storage system according to some embodiments of the present disclosure. Referring to FIG. 6, the storage system 10 may include the host 11, the storage controller 110, and the non-volatile memory device 120.

The host 11 may communicate with the storage controller 110. The host 11 may provide the storage controller 110 with a request (e.g., a state transition request, a read request, or a write request) satisfying the ZNS standard.

The storage controller 110 may include the volatile memory device 111, the ZNS manager 112, the zone table 113, and the zone descriptor 114.

The volatile memory device 111 may store data received from the host 11 under control of the ZNS manager 112. The volatile memory device 111 may include a first buffer memory 111*a*_1 and a second buffer memory 111*a*_2.

In some embodiments, the storage controller 110 may support a simultaneous write operation for plural zones. For example, the storage controller 110 may process a second write request while processing a first write request. The first write request may be used to request an operation of providing data of the first buffer memory 111a_1 to the first block T1_BLK1 of the first zone. The second write request may be used to request an operation of providing data of the second buffer memory 111a_2 to the second block T1_BLK2 of the second zone.

The first buffer memory 111a_1 may sequentially store mapping units MU1_31 to MU1_33. The mapping unit may refer to a unit of data having a mapping relationship between a logical address and a physical address. When there is no power-off request, the first buffer memory 111a_1 may further receive a mapping unit MU1_34 and may then store a programming unit PU1_3 being a set of sequential mapping units MU1_31 to MU1_34 in the first block T1_BLK1. The programming unit PU1_3 may be stored immediately after a programming unit PU1_2. When the power-off request is generated before the first write request is completed, the first buffer memory 111a_1 may store the mapping units MU1_31 to MU1_33 buffered in the first buffer memory 111a_1 in the PLP memory 121b. The data stored in the PLP memory 121b may be used in the active zone refresh operation.

As in the above description, the second buffer memory 111a_2 may sequentially store mapping units MU2_31 to MU2_33. When there is no power-off request, the second buffer memory 111a_2 may further receive a mapping unit MU2_34 and may then store a programming unit PU2_3 being a set of sequential mapping units MU2_31 to MU2_34 in the second block T1_BLK2. The programming unit PU2_3 may be stored immediately after a programming unit PU2_2. When the power-off request is generated before the second write request is completed, the second buffer memory 111a_2 may store the mapping units MU2_31 to MU2_33 buffered in the second buffer memory 111a_2 in the PLP memory 121b. The data stored in the PLP memory 121b may be used in the active zone refresh operation.

The ZNS manager 112 may communicate with the host 11, the volatile memory device 111, the zone table 113, and the zone descriptor 114. The ZNS manager 112 may process a request from the host 11, may allocate a new block to a zone or may release the allocated block, and may manage an operation that allows the volatile memory device 111 to communicate data. The ZNS manager 112 may perform the active zone refresh operation. For example, when the first zone in the active state is terminated according to the power-off request, the ZNS manager 112 may guarantee a sequential write operation in a newly allocated block of the first zone after a next device open.

The zone table 113 may manage a plurality of zone block information. For example, the zone table 113 may manage first zone block information ZBI1 and second zone block information ZBI2. The first zone block information ZBI1 may indicate that the first block T1_BLK1 is allocated to the first zone. The second zone block information ZBI2 may indicate that the second block T1_BLK2 is allocated to the second zone. When a new block is allocated to a zone and/or when an allocated block is released, the ZNS manager 112 may update zone block information of the Zone table 113.

In some embodiments, when the power-off request is generated from the host 11, under control of the ZNS manager 112, the zone table 113 may store the first zone block information ZBI1 and the second zone block information ZBI2 in the PLP memory 121b through the volatile memory device 111.

The zone descriptor 114 may manage a plurality of write pointers. For example, the zone descriptor 114 may manage a first write pointer WP1 and a second write pointer WP2. The first write pointer WP1 may indicate a logical block address immediately after a logical block address corresponding to the programming unit PU1_2, as a location where data buffered in the first buffer memory 111a_1 are to be stored. As in the above description, the second write pointer WP2 may indicate a logical block address immediately after a logical block address corresponding to the programming unit PU2_2, as a location where data buffered in the second buffer memory 111a_2 are to be stored.

In some embodiments, when the power-off request is generated from the host 11, e.g., under control of the ZNS manager 112, the zone descriptor 114 may store the first write pointer WP1 and the second write pointer WP2 in the PLP memory 121b through the volatile memory device 111.

The non-volatile memory device 120 may include the user memory 121a and the PLP memory 121b. The first block T1_BLK1 of the user memory 121a may be allocated to the first zone. The second block T1_BLK2 of the user memory 121a may be allocated to the second zone. The PLP memory 121b may include first to K-th PLP blocks T2_BLK1 to T2_BLKK.

The first block T1_BLK1 may sequentially store the programming units PU1_1 and PU1_2 as first user data.

The second block T1_BLK2 may sequentially store the programming units PU2_1 and PU2_2 as second user data.

When the power-off request is generated from the host 11, the first to K-th PLP blocks T2_BLK1 to T2_BLKK may store the mapping units MU1_31 to MU1_33 of the first buffer memory 111a_1, the mapping units MU2_31 to MU2_33 of the second buffer memory 111a_2, the first and second zone block information ZBI1 and ZBI2 of the zone table 113, and the first and second write pointers WP1 and WP2 of the zone descriptor 114.

Figure 7:
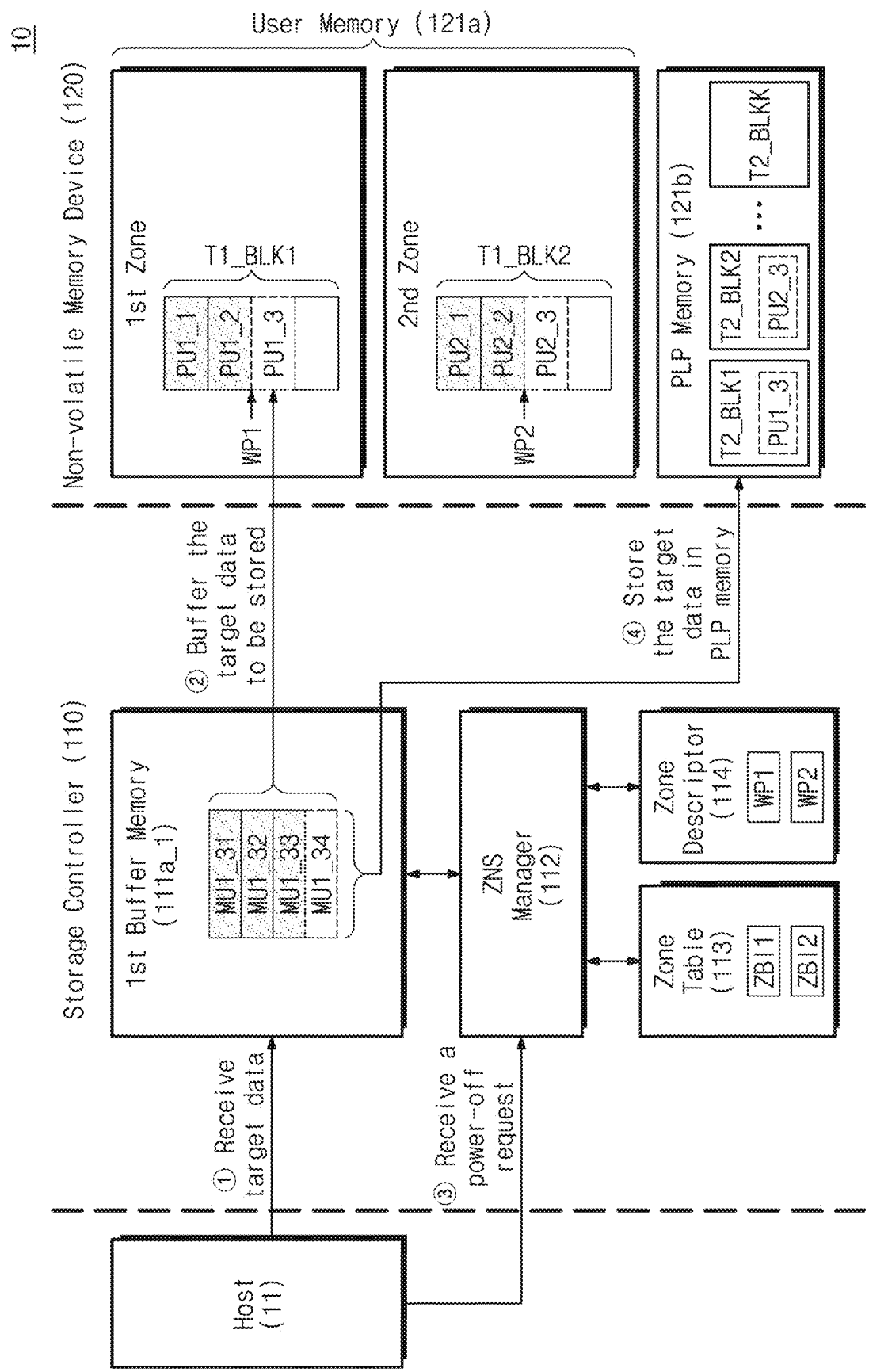
FIG. 7 is a diagram describing a write operation of a storage system according to some embodiments of the present disclosure.

FIG. 7 is a diagram describing a write operation of a storage system according to some embodiments of the present disclosure. Referring to FIG. 7, the storage system 10 may include the host 11, the storage controller 110, and the non-volatile memory device 120. The host 11, the storage controller 110, and the non-volatile memory device 120 may respectively correspond to the host 11, the storage controller 110, and the non-volatile memory device 120 of FIG. 6.

Below, the write operation of the storage system 10 according to some embodiments of the present disclosure will be described.

In a first operation ①, the storage controller 110 may receive target data from the host 11. The target data may be data to be stored in a target block belonging to a target zone from among a plurality of zones.

For example, before the storage controller 110 performs the first operation ①, the storage controller 110 may process the state transition request for the device open and may allocate the first block T1_BLK1 to the first zone. The first block T1_BLK1 may sequentially store the programming units PU1_1 and PU1_2. The programming units PU1_1 and PU1_2 may also be referred to as "first user data".

The first buffer memory 111a_1 of the storage controller 110 may receive the target data and the first write pointer WP1 from the host 11. The target data may include the mapping units MU1_31 to MU1_33 according to the write request. The first write pointer WP1 may indicate a location at which the target data are to be stored. For example, the first write pointer WP1 may indicate the first zone of the first zone and the second zone, may indicate the first block T1_BLK1 of the plurality of blocks (not illustrated) of the first zone, and may indicate a logical block address immediately after a logical block address of the programming unit PU1_2 of the first block T1_BLK1.

In a second operation ②, the first buffer memory 111a_1 may buffer the target data to be stored in the first block T1_BLK1. For example, until the mapping unit MU1_34 being next target data is received from the host 11, the first buffer memory 111a_1 may temporarily store the mapping units MU1_31 to MU1_33 as current target data.

Unlike the example of FIG. 7, in the case where the first buffer memory 111a_1 receives the mapping unit MU1_34 before the power-off request is received, the first buffer memory 111a_1 may store a set of sequential mapping units MU1_31 to MU1_34 in the first block T1_BLK1 as the programming unit PU1_3.

In a third operation ③, the ZNS manager 112 may receive the power-off request from the host 11 while processing the write request. While the write request is processed, the first buffer memory 111a_1 may temporarily store (e.g., buffer) the target data.

In a fourth operation ④, the ZNS manager 112 may control the first buffer memory 111a_1 based on the power-off request in the third operation ③. Under control of the ZNS manager 112, the first buffer memory 111a_1 may store the target data in the first PLP block T2_BLK1 instead of the first block T1_BLK1. The target data may include a set of sequential mapping units MU1_31 to MU1_33. The target data stored in the first PLP block T2_BLK1 may correspond to the programming unit PU1_3 but may not include the mapping unit MU1_34.

As in the above description, when the write request for the second zone is not completed before the power-off request is received, the ZNS manager 112 may back up the target data corresponding to the programming unit PU2_3 to be stored in the second block T1_BLK2 of the second zone.

For better understanding of the present disclosure, the description is given as the mapping units MU1_31 to MU1_33 of the first buffer memory 111a_1 are backed up to the first PLP block T2_BLK1, but the present disclosure is not limited thereto. The mapping units MU1_31 to MU1_33 may be distributed and stored to a plurality of PLP blocks depending on a data size and implementation details.

The ZNS manager 112 may store, in the PLP memory 121b, the first zone block information ZBI1 indicating that the first block T1_BLK1 is allocated to the first zone. The ZNS manager 112 may store, in the PLP memory 121b, the first write pointer WP1 indicating a location where the programming unit PU1_3 is to be stored.

As in the above description, when the write request for the second zone is not processed before the power-off request is received, the ZNS manager 112 may store the second zone block information ZBI2 and the second write pointer WP2 in the PLP memory 121b.

Figure 8:
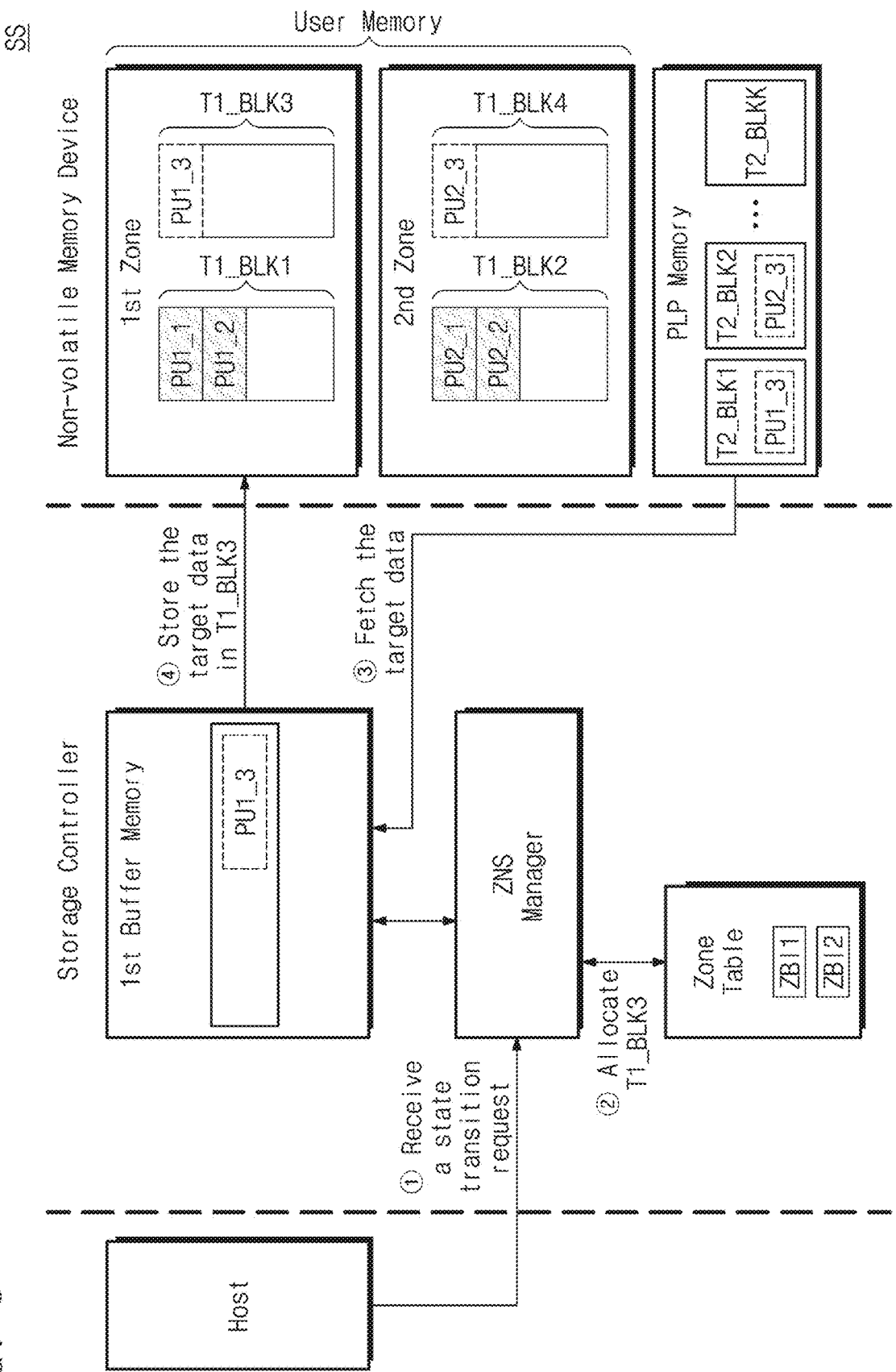
FIG. 8 is a diagram describing a block allocation operation in a conventional storage system.

FIG. 8 is a diagram describing a block allocation operation in a conventional storage system. Referring to FIG. 8, a conventional storage system SS may include a host, a storage controller, and a non-volatile memory device. The host, the storage controller, and the non-volatile memory device may respectively correspond to the host 11, the storage controller 110, and the non-volatile memory device 120 of FIGS. 6 and 7.

For better understanding of the present disclosure, the block allocation operation of the conventional storage system SS will be described. However, the following descriptions may include technical features not associated with the related art, and the following descriptions are not intended to limit the present disclosure.

Below, the block allocation operation of the conventional storage system SS will be described.

In a first operation ①, the ZNS manager may receive a state transition request. The state transition request may be the state transition request for the device open.

For example, before the storage system SS performs the first operation ①, as in the description given with reference to FIG. 7, the storage system SS may be terminated after target data are backed up to the PLP memory 121b. The target data may correspond to the mapping units MU1_31 to MU1_33 of FIG. 7 and are illustrated as the programming unit PU1_3 of a dashed-line box. Afterwards, to process a next write request, the storage system SS may receive the state transition request from the host.

In a second operation ②, the ZNS manager may newly allocate the third block T1_BLK3 to the first zone in response to the state transition request. The ZNS manager may update the first zone block information ZBI1 of the zone table so as to indicate that the first block T1_BLK1 and the third block T1_BLK3 are allocated to the first zone. In the case where an operation similar to the above operation is performed on the second zone, the ZNS manager may newly allocate the fourth block T1_BLK4 to the second zone and may update the second zone block information ZBI2 of the zone table.

In a third operation ③, the first buffer memory may fetch the target data present in the first PLP block T2_BLK1 of the PLP memory under control of the ZNS manager. The first buffer memory may temporarily store the fetched target data.

In a fourth operation ④, the first buffer memory may store the target data in the third block T1_BLK3 of the first zone under control of the ZNS manager.

After the power-off request is processed, the non-volatile memory device may be incapable of performing a sequential write operation on the same block in structure. In the case where the device open is processed after the power-off request, the non-volatile memory device may support the sequential write operation by using the third block T1_BLK3 newly allocated. The remaining storage space of the first block T1_BLK1 other than the programming units PU1_1 and PU1_2 may be wasted. Also, both the first block T1_BLK1 and the third block T1_BLK3 may be required to manage the programming units PU1_1 and PU1_2 and the target data. In the case where the power-off request is further generated, the number of blocks allocated to manage valid data in the first zone may further increase.

As described above, according to the block allocation operation of the conventional storage system SS, the storage space of the block allocated before the power-off request may be wasted, the number of memory blocks allocated per zone may increase as a power cycle (e.g., a device open after the power-off request is processed) is repeated, and a state in which a physically sequential write operation in the same memory block is possible fails to be maintained.

Figure 9:
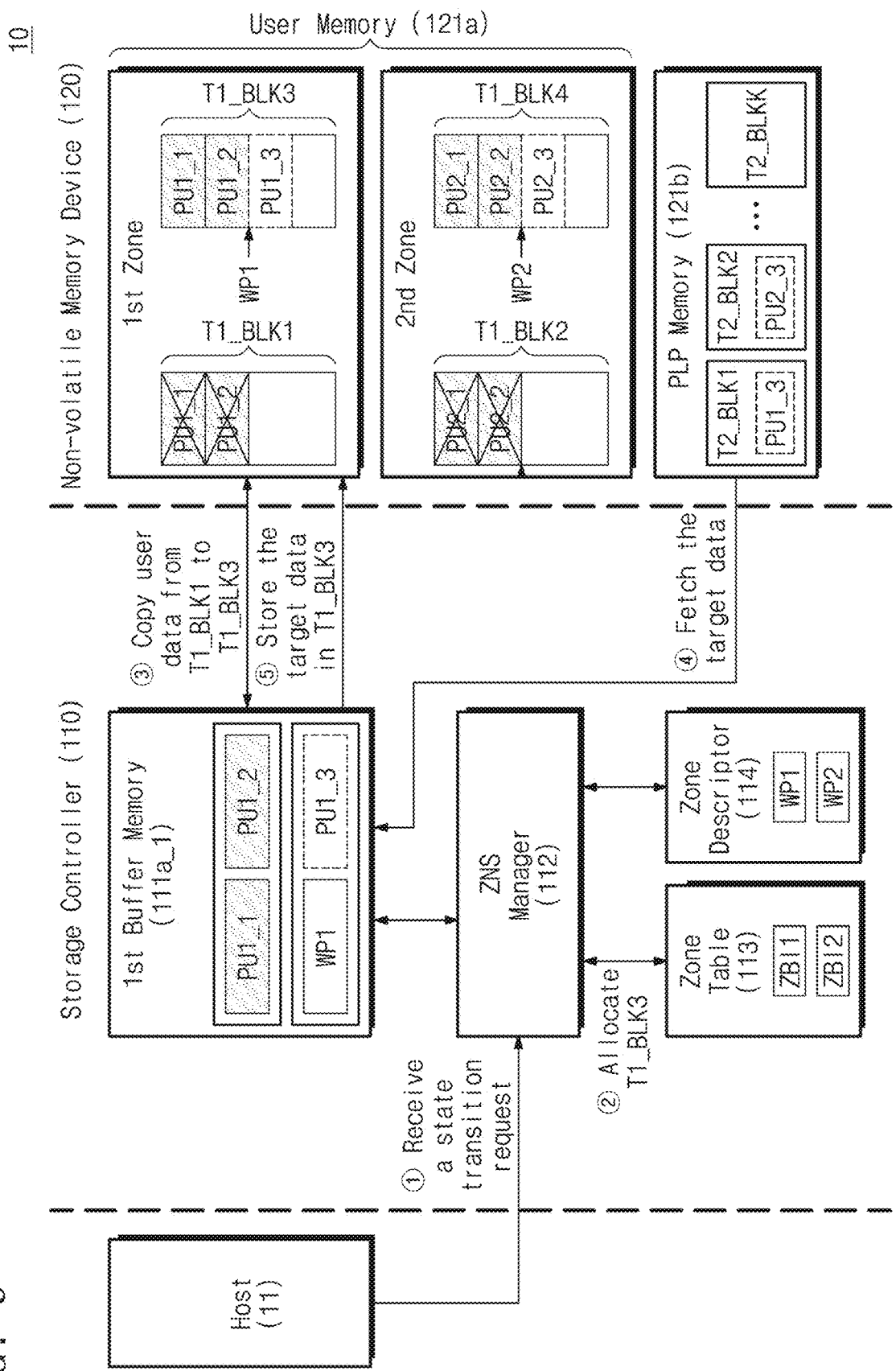
FIG. 9 is a diagram describing a block allocation operation of a storage system according to some embodiments of the present disclosure.

FIG. 9 is a diagram describing a block allocation operation of a storage system according to some embodiments of the present disclosure. Referring to FIG. 9, the storage system 10 according to some embodiments of the present disclosure may include the host 11, the storage controller 110, and the non-volatile memory device 120. The host 11, the storage controller 110, and the non-volatile memory device 120 may respectively correspond to the host 11, the storage controller 110, and the non-volatile memory device 120 of FIGS. 6 and 7.

According to some embodiments of the present disclosure, the storage system 10 may set the active zone refresh operation. In detail, with regard to a zone having the active state before the processing of an immediately previous power-off request, the storage system 10 may perform a zone management operation such that a sequential write operation is possible in a newly allocated block, while the number of memory blocks allocated per zone is maintained.

Below, the block allocation operation of the storage system 10 according to some embodiments of the present disclosure will be described.

In a first operation ①, the ZNS manager 112 of may receive the state transition request. The state transition request may be the state transition request for the device open.

For example, before the storage system 10 performs the first operation ①, as in the description given with reference to FIG. 7, the storage system 10 may be terminated after target data are backed up to the PLP memory 121b. The target data may correspond to the mapping units MU1_31 to MU1_33 of FIG. 7 and are illustrated as the programming unit PU1_3 of a dashed-line box. Afterwards, to process a next write request, the storage system 10 may receive the state transition request from the host 11.

In a second operation ②, the ZNS manager 112 may newly allocate the third block T1_BLK3 to the first zone in response to the state transition request. The ZNS manager 112 of may update the first zone block information ZBI1 of the zone table 113 so as to indicate that the first block T1_BLK1 and the third block T1_BLK3 are allocated to the first zone. In the case where an operation similar to the above operation is performed on the second zone, the ZNS manager 112 may newly allocate the fourth block T1_BLK4 to the second zone and may update the second zone block information ZBI2 of the zone table 113.

In a third operation ③, under control of the ZNS manager 112, the first buffer memory 111a_1 may copy the user data of the first block T1_BLK1 in the first zone to the third block T1_BLK3. The user data of the first block T1_BLK1 may include the programming units PU1_1 and PU1_2.

After the user data are copied, the first block T1_BLK1 may be an invalid memory block. The ZNS manager 112 may discard the first block T1_BLK1 being an invalid memory block. The operation of discarding the first block T1_BLK1 may be processed in the on-the-fly manner, or may be processed as a background operation at a time when the I/O load of the storage controller 110 is small.

In the case where an operation similar to the above operation is performed on the second zone, the ZNS manager 112 may copy the programming units PU2_1 and PU2_2 of the second blocks T1_BLK2 by using another buffer memory.

In a fourth operation ④, the first buffer memory 111a_1 may fetch the target data present in the first PLP block T2_BLK1 of the PLP memory 121b under control of the ZNS manager 112. The first buffer memory 111a_1 may temporarily store the fetched target data.

The first write pointer WP1 may be present in the PLP memory 121b and/or may be loaded in advance onto the zone descriptor 114. The ZNS manager 112 may refer to the first write pointer WP1 used before the power-off request is processed. The first write pointer WP1 may indicate a logical block address immediately after a logical block address of the programming unit PU1_2, as a location where the target data are to be stored.

In a fifth operation ⑤, under control of the ZNS manager 112, the first buffer memory 111a_1 may store the target data immediately after the programming unit PU1_2 of the third block T1_BLK3 by using the first write pointer WP1.

Referring to the first zone, the first block T1_BLK1 being an invalid memory block may be discarded. In the first zone, because the first block T1_BLK1 is discarded and the third block T1_BLK3 newly allocated is valid, the number of blocks allocated per zone may be maintained even after the processing of the power-off request.

The third block T1_BLK3 may sequentially store the programming units PU1_1 and PU1_2 and the target data (e.g., the programming unit PU1_3 of a dashed-line box). Subsequently, when new target data according to a new write request are received from the host 11, the new target data may be stored to be physically sequential to the target data (e.g., the programming unit PU1_3 of a dashed-line box).

In the case where an operation similar to the above operation is performed on the second zone, the ZNS manager 112 may fetch the target data of the second PLP block T2_BLK2 by using another buffer memory, may load the second write pointer WP2, and may store the target data (e.g., the programming unit PU2_3 of a dashed-line box) immediately after the programming unit PU2_2 of the fourth block T1_BLK4.

The third operation ③ and the fifth operation ⑤ may be omitted with respect to zones that do not have the active state before the power-off request is processed. The third operation ③ and the fifth operation ⑤ may be a portion of the active zone refresh operation.

Figure 10:
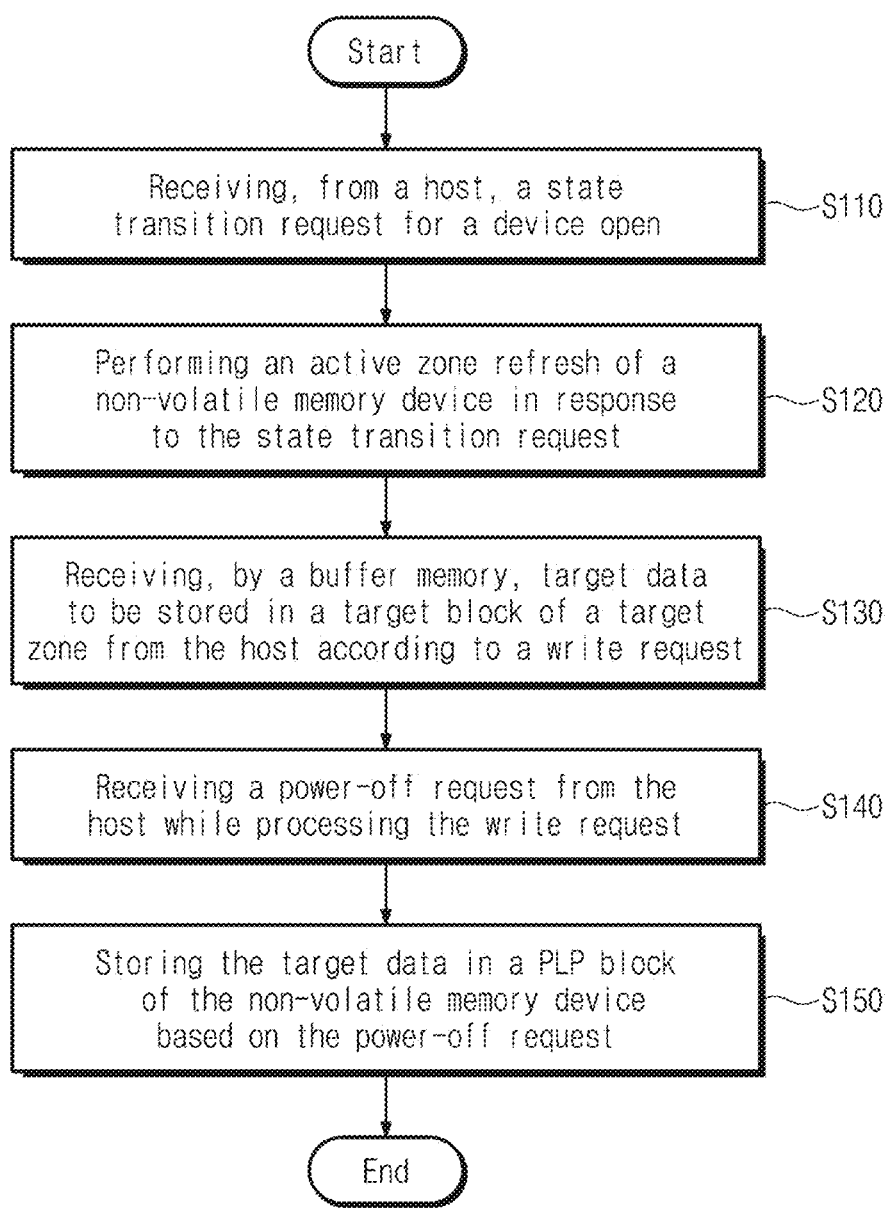
FIG. 10 is a flowchart describing a method of operating a storage controller according to some embodiments of the present disclosure.

FIG. 10 is a flowchart describing a method of operating a storage controller according to some embodiments of present disclosure. Referring to FIG. 10, a storage controller may communicate with a host and a non-volatile memory device. The storage controller may correspond to the storage controller 110 described with reference to FIGS. 1, 2, 6, 7, and 9. Operation S110 and operation S120 may correspond to the block allocation operation of FIG. 9. Operation S130 to operation S150 may correspond to the write operation of FIG. 7.

In operation S110, the storage controller may receive the state transition request for the device open from the host.

In operation S120, the storage controller may perform the active zone refresh operation of the non-volatile memory device in response to the state transition request. The active zone refresh operation may include processing a zone, which is an active state before an immediately previous power-off, from among a plurality of zones of the non-volatile memory device such that a sequential write operation is performed in one block.

In operation S130, the storage controller may receive, by a buffer memory, target data to be stored in a target block of a target zone among the plurality of zones from the host in response to the write request. The write request may be included in the state transition request (e.g., a request for the transition to the ZSEO state) in operation S110 or may be received separately from the state transition request (e.g., a request for the transition to the ZSEO state) in operation S110.

In operation S140, while the write request in operation S130 is processed, the storage controller may receive the power-off request from the host. For example, the power-off request may indicate the NPO or the SPO.

In operation S150, based on the power-off request in operation S140, the storage controller may store the target block in a PLP block of the non-volatile memory device instead of the target block.

In some embodiments, operation S150 may include storing a write pointer indicating a logical block address of the target data in a PLP memory, and storing zone block information, which indicates that the target block is allocated to the target block, in the PLP memory.

In some embodiments, the storage controller may process a plurality of write requests for the plurality of zones in parallel. For example, the method may include receiving, by another buffer memory, another target data to be stored in another block of another zone depending on another write request. When the power-off request is received during the processing of the another write request, the storage controller may store the other target data of the other buffer memory in another PLP block.

In some embodiments, when the power-off request is not generated during the processing of the write request in operation S130, the storage controller may store the target data in the target block. For example, the storage controller may further receive next target data. The buffer memory of the storage controller may be filled with the target data and the next target data. The buffer memory may sequentially store the target data and the next target data in the target block. In this case, operation S140 and operation S150 may be omitted.

In some embodiments, the target block may be implemented in the first type, and the PLP block may be implemented in the second type having the higher reliability than the first type. For example, the target block may be implemented with one of a multi-level cell (MLC), a triple level cell (TLC), a quadruple level cell (QLC), etc., and the PLP block may be implemented with a single level cell (SLC).

In some embodiments, operation S110 to operation S150 may be repeatedly performed. Even though the number of power cycles increases, the number of blocks allocated per zone may be maintained by performing the active zone refresh operation.

Figure 11:
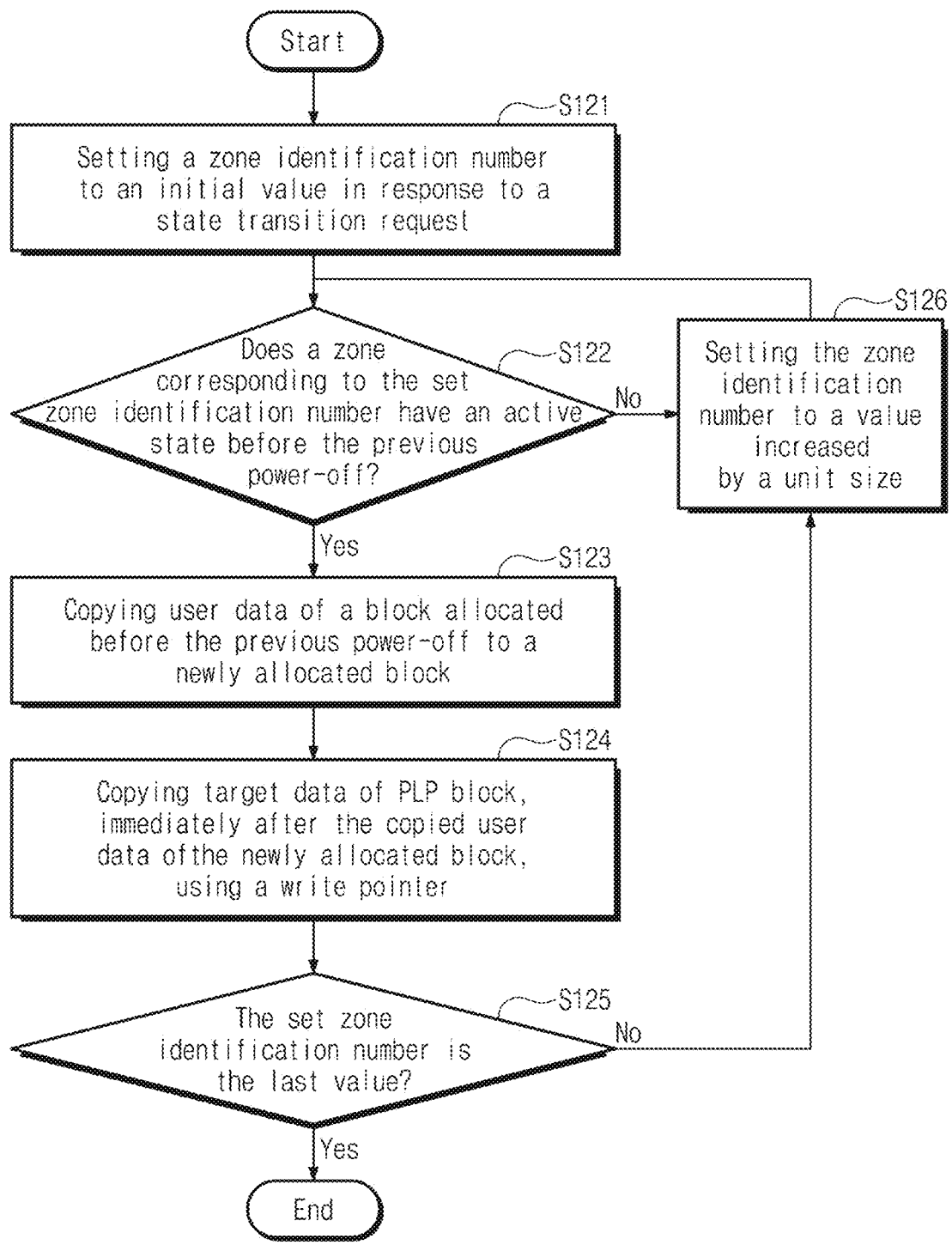
FIG. 11 is a flowchart describing a method of operating a storage controller according to some embodiments of the present disclosure.

FIG. 11 is a flowchart describing a method of operating a storage controller according to some embodiments of the present disclosure. Referring to FIG. 11, a storage controller may communicate with a host and a non-volatile memory device. The storage controller may correspond to the storage controller 110 described with reference to FIGS. 1, 2, 6, 7, and 9. Operation S121 to operation S126 may correspond to operation S120 of FIG. 10 and the block allocation operation of FIG. 9.

In operation S121, the storage controller may set a zone identification number to an initial value in response to the state transition request. The zone identification number may indicate a zone being currently processed from among a plurality of zones that are managed by the storage controller. The initial value may be the smallest value of zone identification numbers respectively corresponding to the plurality of zones.

In operation S122, the storage controller may determine whether a zone corresponding to the set zone identification number has the active state before an immediately previous power-off. When it is determined that the zone corresponding to the set zone identification number has the active state before the immediately previous power-off, the storage controller may perform operation S123. When it is determined that the zone corresponding to the set zone identification number does not have the active state before the immediately previous power-off, the storage controller may perform operation S126.

In operation S123, the storage controller may copy user data of a block allocated before the immediately previous power-off to a newly allocated block. For example, operation S123 may include newly allocating a block of the zone corresponding to the set zone identification number, copying the user data of the block allocated before the immediately previous power-off to the newly allocated block, and discarding an invalid block (e.g., the block allocated before the immediately previous power-off) after copying the user data.

In operation S124, by using a write pointer, the storage controller may copy target data of a PLP block immediately after the copied user data of the newly allocated block. The target data of the PLP block may correspond to a result of backing up target data of the buffer memory before the immediately previous power-off.

In operation S125, the storage controller may determine whether the set zone identification number is the last value. The last value may be the greatest value of the zone identification numbers respectively corresponding to the plurality of zones. When it is determined that the set zone identification number is the last value, the storage controller may terminate the operation. When it is determined that the set zone identification number is not the last value, the storage controller may perform operation S126.

Operation S126 may be performed after operation S122 or operation S125. In operation S126, the storage controller may again set the zone identification number to a value increased as much as a unit size. The storage controller may again perform operation S122 by using the again set zone identification number as the set zone identification number. For example, the unit size may be "1". When the zone identification number increases from "1" to "2", the storage controller may perform the active zone refresh operation depending on whether the first zone has the active state and may then perform the active zone refresh operation depending on whether the second zone has the active state.

Figure 12:
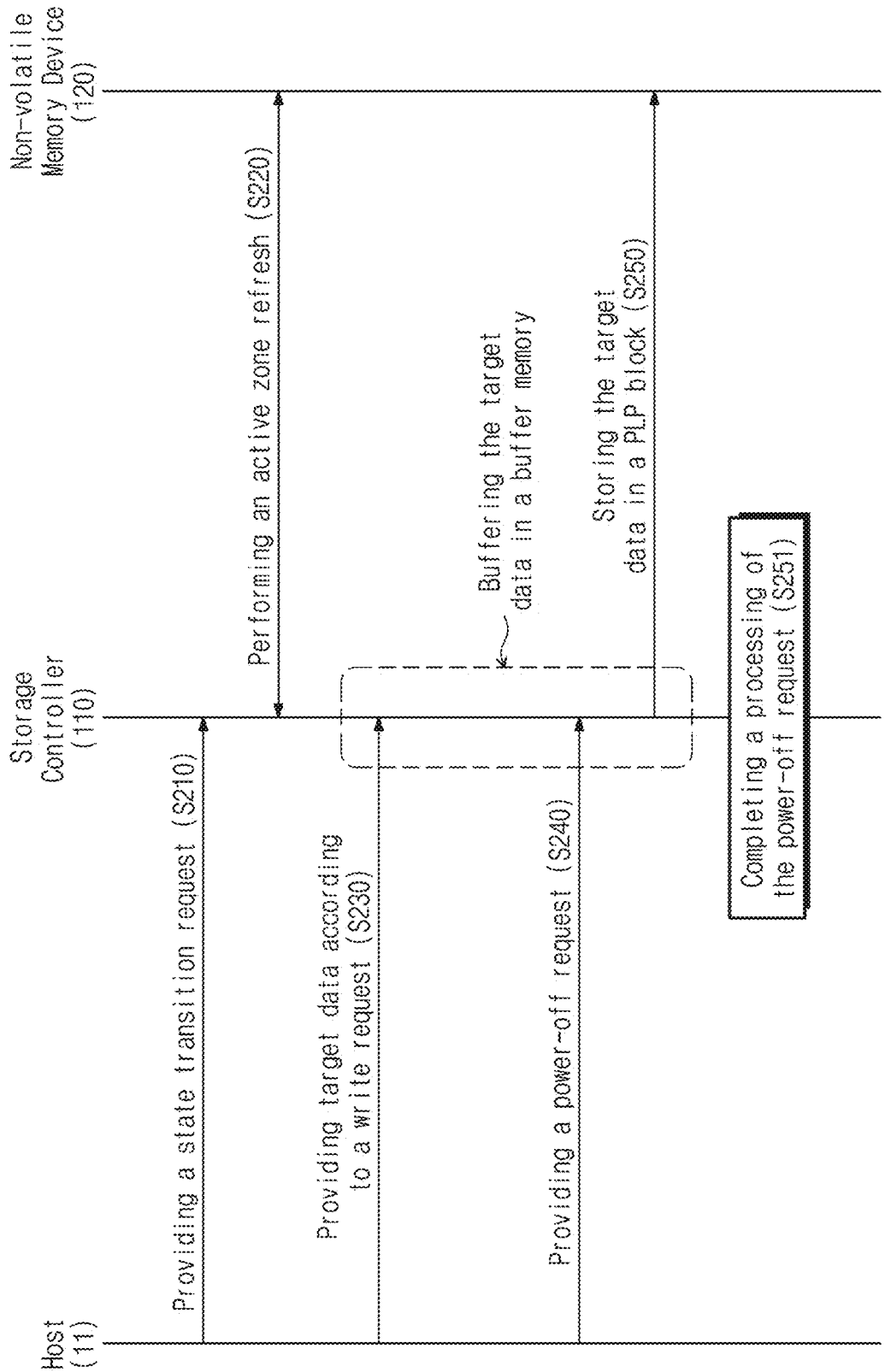
FIG. 12 is a flowchart describing a method of operating a storage system according to some embodiments of the present disclosure.

FIG. 12 is a flowchart describing a method of operating a storage system according to some embodiments of the present disclosure. Referring to FIG. 12, the storage system may include the host 11, the storage controller 110, and the non-volatile memory device 120. The storage system may correspond to the storage system 10 described with reference to FIGS. 1, 6, 7, and 9.

In operation S210, the host 11 may provide the state transition request to the storage controller 110. The state transition request may be a request for the device open.

In operation S220, the storage controller 110 may perform the active zone refresh operation based on the communication with the non-volatile memory device 120. The active zone refresh operation may include processing a zone, which has the active state before an immediately previous power-off, from among a plurality of zones such that a sequential write operation is possible in one block.

In operation S230, the host 11 may provide target data to the storage controller 110 depending on a write request. The target data may be data to be stored in a target block of a target zone. The target data may be temporarily stored (e.g., buffered) in a buffer memory of the storage controller 110.

In operation S240, the host 11 may provide the power-off request to the storage controller 110 while the write request is processed. For example, before the storage controller 110 stores the target data in the target block, the storage controller 110 may receive the power-off request from the host 11.

In operation S250, the storage controller 110 may store the target data of the buffer memory in the PLP block instead of the target block. In some embodiments, during operation S230 to operation S250, the storage controller 110 may buffer the target data in the buffer memory.

In operation S251, the storage controller 110 may complete the processing of the power-off request. For example, the power supply to the storage controller 110 and the non-volatile memory device 120 may be interrupted.

In some embodiments, operation S210 to operation S251 may be repeatedly performed. Even though the number of power cycles increases, the number of blocks allocated per zone may be maintained by performing the active zone refresh operation.

According to some embodiments of the present disclosure, a storage controller performing an active zone refresh operation, a method of operating the storage controller, and a method of operating a storage device including the storage controller are provided.

Also, even though a power-off occurs, the storage controller may maintain a state of being physically sequentially written by guaranteeing the serializability in the same block and may increase an available storage capacity by reducing the block waste.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a storage controller configured to communicate with a host and a non-volatile memory device, the method comprising:
   receiving, from the host, a first state transition request for a device open;
   performing a first active zone refresh operation of the non-volatile memory device in response to the first state transition request such that at least one zone, from among a plurality of zones of the non-volatile memory device and which has an active state before an immediately previous power-off, is processed to a sequentially writable state in at least one block;
   receiving, by a first buffer memory, first target data to be stored in a first block of a first zone, among the plurality of zones, based on a first write request received from the host after performing the first active zone refresh operation;
   receiving a first power-off request from the host before the first write request is completed; and
   storing the first target data remaining in the first buffer memory in a first power loss protection (PLP) block of the non-volatile memory device, instead of the first block, based on receiving the first power-off request,
   wherein the performing of the first active zone refresh operation of the non-volatile memory device in response to the first state transition request includes
      copying user data of a block of a zone, which is allocated before the immediately previous power-off, to a newly allocated block, and
      copying, sequentially to the copying of the user data, corresponding target data of a corresponding PLP block using a corresponding write pointer.

2. The method of claim 1, wherein the first PLP block has a higher reliability than the first block.

3. The method of claim 1, wherein the user data stored in the first block include a plurality of programming units which are logically and physically sequential, and
   wherein a logical block address of a last programming unit of the plurality of programming units is an address immediately before a logical block address of the first target data.

4. The method of claim 1, further comprising:
   receiving, by a second buffer memory, second target data to be stored in a second block of a second zone, among the plurality of zones, based on a second write request received from the host after performing the first active zone refresh operation; and
   storing the second target data in a second PLP block of the non-volatile memory device, instead of the second block, based on the first power-off request,
   wherein the first power-off request is received before the first write request and the second write request is completed.

5. The method of claim 1, further comprising:
   completing the first power-off request after storing the first target data in the PLP block;
   receiving, from the host, a second state transition request for the device open after the first power-off request is completed;
   performing a second active zone refresh operation of the non-volatile memory device in response to the second state transition request such that the first zone, which has the active state before the first power-off request is completed, is processed to a sequentially writable state in a third block newly allocated; and
   receiving, by the first buffer memory, third target data to be stored in the third block based on a third write request received from the host after performing the second active zone refresh operation.

6. The method of claim 5, further comprising:
   receiving, by the first buffer memory, fourth target data to be stored in the third block based on the third write request received from the host, wherein the fourth target data are sequential to the third target data and the first buffer memory is filled with the third target data and the fourth target data; and
   sequentially storing the third target data and the fourth target data of the first buffer memory in the third block.

7. The method of claim 5, further comprising:
   receiving a second power-off request from the host, before the third write request is completed; and
   storing the third target data in a third PLP block of the non-volatile memory device, instead of the third block, based on the second power-off request.

8. The method of claim 5, wherein the performing of the second active zone refresh operation of the non-volatile memory device in response to the second state transition request includes:
   determining whether the first zone has the active state before the first power-off request is completed;
   allocating the third block of the first zone when it is determined that the first zone has the active state before the first power-off request is completed;
   copying user data of the first block of the first zone to the third block; and
   copying the first target data of the first PLP block, immediately after the copying of the user data of the third block, using a write pointer, and
   wherein a logical block address of the third target data is immediately after a logical block address of the copied first target data.

9. The method of claim 8, further comprising:
discarding the first block after copying the user data of the first block to the third block.

10. The method of claim 1, wherein the performing of the first active zone refresh operation of the non-volatile memory device in response to the first state transition request includes:
setting a zone identification number to an initial value in response to the first state transition request; and
determining whether a zone corresponding to the set zone identification number, from among the plurality of zones, has the active state before the immediately previous power-off,
wherein the copying the user data includes copying the user data of a block of the corresponding zone, which is allocated before the immediately previous power-off, to a newly allocated block when it is determined that the corresponding zone has the active state before the immediately previous power-off, and
wherein the sequentially copying the corresponding target data includes copying the corresponding target data of a corresponding PLP block immediately after the copied user data of the newly allocated block using a corresponding write pointer.

11. The method of claim 10, wherein the performing of the first active zone refresh operation of the non-volatile memory device in response to the first state transition request further includes:
determining whether the set zone identification number is a last value after copying the corresponding target data of the corresponding PLP block;
setting, again, the set zone identification number to a value increased by a unit size when it is determined that the set zone identification number is not the last value; and
determining whether a zone corresponding to the again set zone identification number from among the plurality of zones has the active state before the immediately previous power-off.

12. The method of claim 1, wherein the storing of the first target data in the first PLP block of the non-volatile memory device includes:
storing a write pointer indicating a logical block address of the first target data; and
storing zone block information indicating that the first block is allocated to the first zone.

13. The method of claim 1, wherein the storage controller supports a zoned namespace (ZNS) standard of a non-volatile memory (NVM) express.

14. The method of claim 13, wherein the first state transition request indicates a transition to at least one of an implicitly opened zone (ZSIO) state or an explicitly opened zone (ZSEO) state of the ZNS standard, and
wherein the active state includes the ZSIO state, the ZSEO state, and a closed zone (ZSC) state of the ZNS standard.

15. A method of operating a storage device, the method comprising:
receiving, from a host, a state transition request for a device open;
performing an active zone refresh operation of a non-volatile memory device in response to the state transition request such that a zone, from among a plurality of zones of the non-volatile memory device and which has an active state before an immediately previous power-off, is processed to a sequentially writable state in at least one block;
receiving, by a buffer memory, target data to be stored in a target block of a target zone, among the plurality of zones, based on a first write request received from the host after performing the active zone refresh operation;
receiving a power-off request from the host before the write request is completed; and
storing the target data remaining in the first-buffer memory and target data information in a power loss protection (PLP) block of the non-volatile memory device, instead of the target block, based on receiving the power-off request,
wherein the target data includes at least one of zone block information or a write pointer indicating a location of a logical block address immediately after a logical block address corresponding to the target data written to the target block, and
wherein the performing of the active zone refresh operation of the non-volatile memory device in response to the state transition request includes
copying user data of a block of a zone, which is allocated before the immediately previous power-off, to a newly allocated block, and
copying, sequentially to the copying of the user data, corresponding target data of a corresponding PLP block using a corresponding write pointer.

16. The method of claim 15, wherein the target block is one of a multi-level cell (MLC), a triple level cell (TLC), or a quadruple level cell (QLC), and
wherein the PLP block is a single level cell (SLC).

17. A storage controller comprising:
a buffer memory configured to receive, from a host, first target data to be stored in a target block of a target zone, among a plurality of zones of a non-volatile memory device, based on a write request; and
processing circuitry configured to
receive, from the host, a state transition request for a device open,
perform an active zone refresh operation of the non-volatile memory device in response to the state transition request,
allow the buffer memory to receive the first target data from the host, and
allow the buffer memory to store the first target data remaining in the a first buffer memory in a power loss protection (PLP) block of the non-volatile memory device, instead of the target block, in response to receiving a power-off request the host before the write request is completed, and
wherein the active zone refresh operation includes processing a zone, from among the plurality of zones and which is an active state before an immediately previous power-off, such that at least one of block of the processed zone is configured to perform a sequential write operation, and
wherein the performing of the active zone refresh operation of the non-volatile memory device in response to the state transition request includes
copying user data of a block of a zone, which is allocated before the immediately previous power-off, to a newly allocated block, and
copying, sequentially to the copying of the user data, corresponding target data of a corresponding PLP block using a corresponding write pointer.

18. The storage controller of claim 17, further comprising:
a zone table configured to communicate with the processing circuitry and to manage a plurality of zone block information indicating allocated blocks of each of the plurality of zones; and
wherein the processing circuitry is further configured to manage a write pointer indicating a logical block address of the first target data.

19. The storage controller of claim 17, wherein the processing circuitry is further configured to:
allow the buffer memory to receive second target data to be stored in the target block, based on the write request, from the host after receiving the first target data and before receiving the power-off request; and
allow the buffer memory to store the first target data and the second target data in the target block when the buffer memory is filled with the first target data and the second target data, and
wherein the first target data and the second target data stored in the target block are logically and physically sequential.

20. The storage controller of claim 17, wherein the PLP block has a higher reliability than the target block.

* * * * *